United States Patent [19]

Sellers

[11] Patent Number: 5,742,242

[45] Date of Patent: Apr. 21, 1998

[54] KEYBOARD USING PRESSURIZED FLUID TO GENERATE KEY STROKE CHARACTERISTICS

[75] Inventor: Charles A. Sellers, Houston, Tex.

[73] Assignee: Compaq Computer Corporation, Houston, Tex.

[21] Appl. No.: 769,796

[22] Filed: Dec. 19, 1996

[51] Int. Cl.$^6$ .......................... H03K 17/94; H03M 11/00
[52] U.S. Cl. .................. 341/22; 200/5 R; 341/34; 345/168
[58] Field of Search .................. 341/22, 34, 27; 345/168; 400/491, 491.1; 200/5 E, 5 R, 83 B

[56] References Cited

U.S. PATENT DOCUMENTS

| | | | |
|---|---|---|---|
| 3,603,983 | 9/1971 | Mitchell | 341/34 |
| 4,109,118 | 8/1978 | Kley | 200/5 R |
| 4,795,888 | 1/1989 | MacFarlane | 235/145 R |
| 5,459,461 | 10/1995 | Crowley et al. | 341/22 |
| 5,595,449 | 1/1997 | Vitkin | 341/22 |
| 5,648,771 | 7/1997 | Halgren et al. | 341/22 |

*Primary Examiner*—Jeffery Hofsass
*Assistant Examiner*—Timothy Edwards, Jr.
*Attorney, Agent, or Firm*—Konneker & Smith, P.C.

[57] ABSTRACT

A notebook computer is provided with a collapsible keyboard structure in which, during operation of the computer, the keys are held in extended operating positions by the force of a pressurized fluid-filled flexible mat member having spaced apart orificed compartments against which bottom ends of vertically movable plunger portions of the keys downwardly bear. Position sensors monitor the stroke positions of the keys and, as the keys are depressed during computer use, responsively transmit corresponding position signals to a control system which utilizes the position signals to alter the fluid pressure within the mat member in a manner providing the keys with predetermined, selectively variable stroke force/distance characteristics. When the computer is turned off, fluid pressure within the mat member is relieved in a manner permitting the keys to collapse to retracted storage/transport orientations, thereby reducing the overall thickness of the keyboard until subsequent operation of the computer.

37 Claims, 3 Drawing Sheets

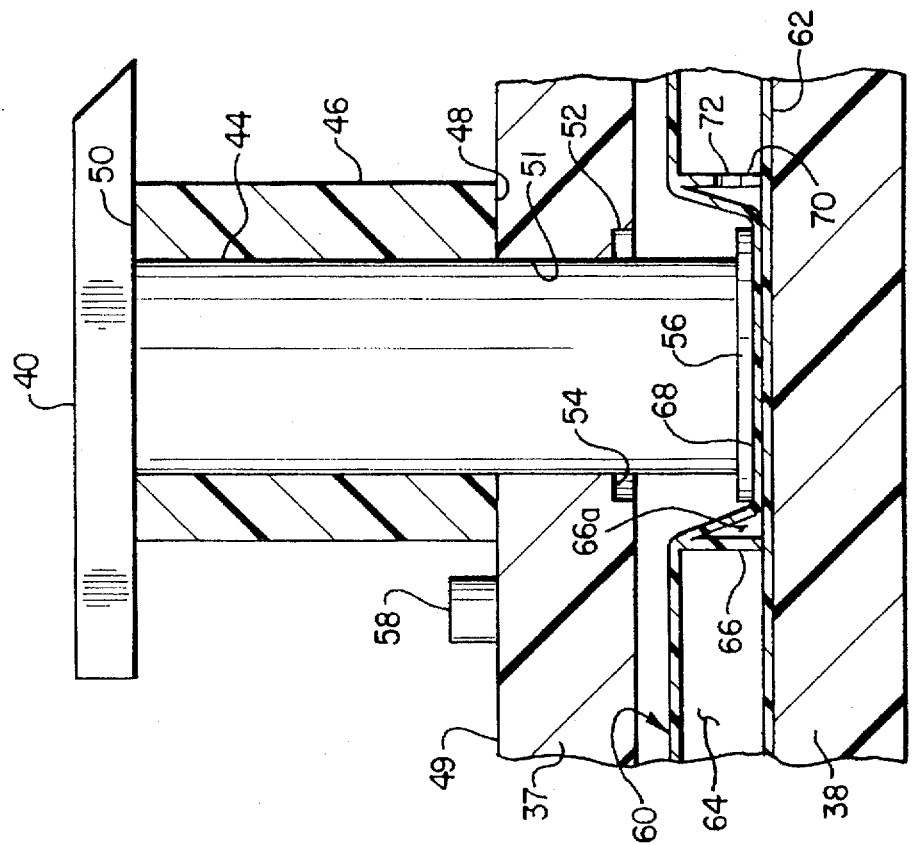
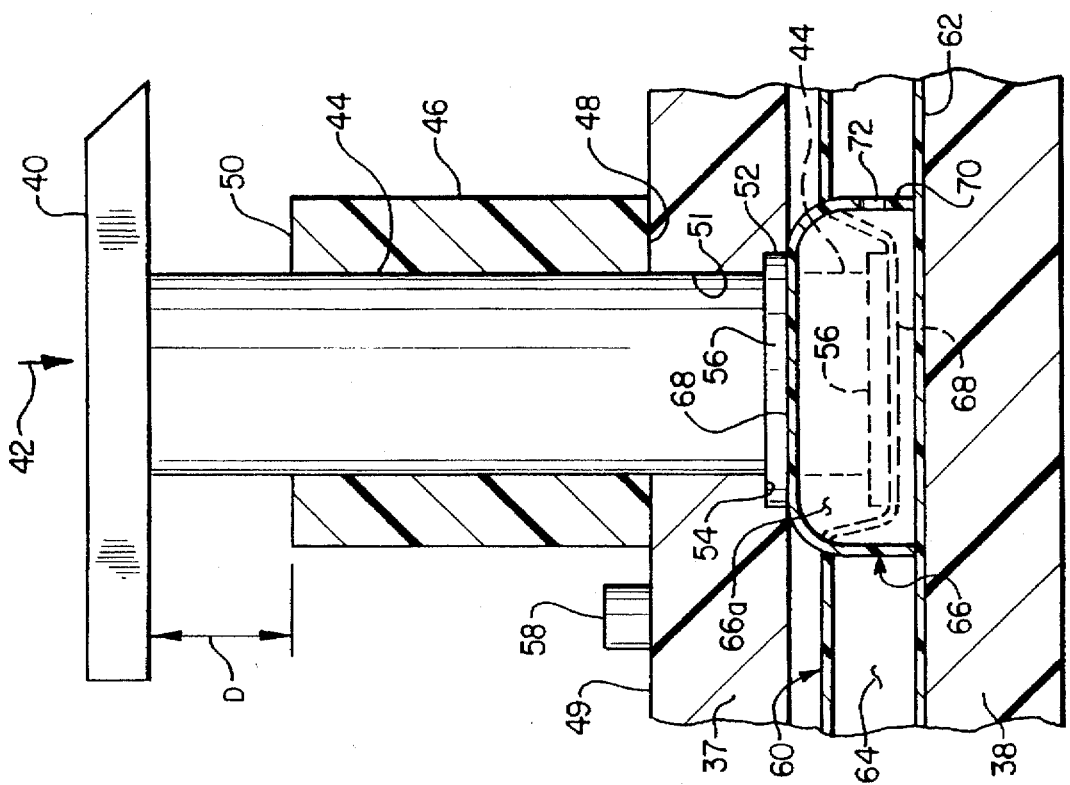

KEYBOARD USING PRESSURIZED FLUID TO GENERATE KEY STROKE CHARACTERISTICS

BACKGROUND OF THE INVENTION

1. Field of the Invention

The present invention relates generally to key switch apparatus and, in a preferred embodiment thereof, more particularly relates to specially designed computer keyboard apparatus in which a pressurized fluid is used to generate selectively variable keystroke characteristics.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

A continuing challenge in the design of notebook computers, however, is their keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

A conventional method of constructing a notebook computer keyboard is to position under each key cap a resilient spring member such as an elastomeric dome structure. Each dome holds its overlying key cap in an upwardly extended position until a user manually depresses the key against the resilient resistance of the underlying dome. When the dome is downwardly deformed a predetermined distance by the key cap a portion of the dome presses and closes an underlying electric switch element which responsively causes an appropriate key activation signal to be generated for use in carrying out the operating command associated with the depression of that particular key. Upon release of the key, the downwardly deformed elastomeric dome springs back to its original "at rest" position to upwardly return the depressed key cap member to its extended position.

While this conventional key support and switch apparatus has proven to be generally suitable for its intended purpose, and has been widely utilized, it has two primary limitations and disadvantages. First, the use of the elastomeric domes or other resilient key cap return spring members results in a keyboard structure having a constant height in both its operating and storage/transport modes—a constant height which includes the total keystroke distance. Second, the elastomeric domes or other resilient key cap return spring members provide fixed force/distance stroke characteristics for the keys. Thus, the keystroke "feel" built into the keyboard will appeal to some users while being at least somewhat objectionable to a number of other users of the keyboard.

In view of the foregoing it can readily be seen that it would be desirable to provide an improved keyboard structure that eliminates or at least substantially reduces the above-mentioned limitations and disadvantages associated with conventionally constructed keyboards of the type generally described above. It is accordingly an object of the present invention to provide such an improved keyboard structure.

SUMMARY OF THE INVENTION

In carrying out principles of the present invention, in accordance with a preferred embodiment thereof, an electronic device, representatively a portable notebook computer, is provided with a keyboard portion comprising a support structure and a series of manually depressible key cap members each carried on the support structure for a stroke movement relative thereto between an outwardly extended use position and an inwardly retracted storage and transport position.

A biasing structure associated with the key cap members is operative to utilize a pressurized fluid force in a manner yieldingly biasing the key cap members toward their outwardly extended use positions. Control apparatus is provided and is operative to sense the stroke position of each key cap member and responsively vary the pressurized fluid biasing force thereon as a function of the sensed stroke position in accordance with a predetermined desired key force/key travel relationship for the keyboard.

Preferably, the control apparatus is operative to selectively vary the predetermined desired key force/key travel relationship to thereby permit the computer user to selectively adjust the keystroke "feel" of the keyboard, the predetermined desired key force/key travel relationship may be nonlinear, and in the absence of a fluid pressure biasing force on the key cap members they may be collapsed to their retracted positions to thereby reduce the thickness of the keyboard for storage and transport thereof.

Representatively, each key cap member has a key activation position intermediate its extended and retracted positions, and the control apparatus is further operative to generate a key activation signal for each key cap member in response to the key cap member reaching its key activation position while approaching its retracted position.

In a preferred embodiment of the invention, the biasing structure is a hollow flexible pad member filled with either a gas or a liquid and having spaced, sealed off subcompartments which underlie and forcibly engage depending force transfer members secured to the key cap members. Interior side wall sections of the subcompartments have orifice openings therein which communicate the subcompartment interiors with the surrounding main interior space of the hollow flexible pad member.

The control apparatus representatively comprises a preprogrammed microprocessor; a series of position sensors associated with the key cap members and operative to output position sensing signals, indicative of the sensed key cap stroke positions, to the microprocessor; and a variable speed fluid pump having an outlet coupled to the interior of the pad member. The microprocessor receives the position sensing signals, and a signal indicative of a sensed fluid pressure within the pad, and controls the speed of the pump in a manner maintaining a selectively variable, user-selected relationship between the magnitudes of the position signals and the sensed pressure within the pad to thereby maintain a selectively variable relationship between the stroke force and travel distance of each key cap member. Additionally, the control system is provided with a pressure relief structure operative to reduce the fluid pressure within the pad in a manner permitting the key cap members to be collapsed to their retracted storage and transport positions.

BRIEF DESCRIPTION OF THE DRAWINGS

FIGS. 3A and 3B are enlarged scale cross-sectional views of the circled area "3" in FIG. 1 with the keyboard key cap members respectively in their extended use positions and their retracted storage/transport positions;

DETAILED DESCRIPTION

Figure 1:
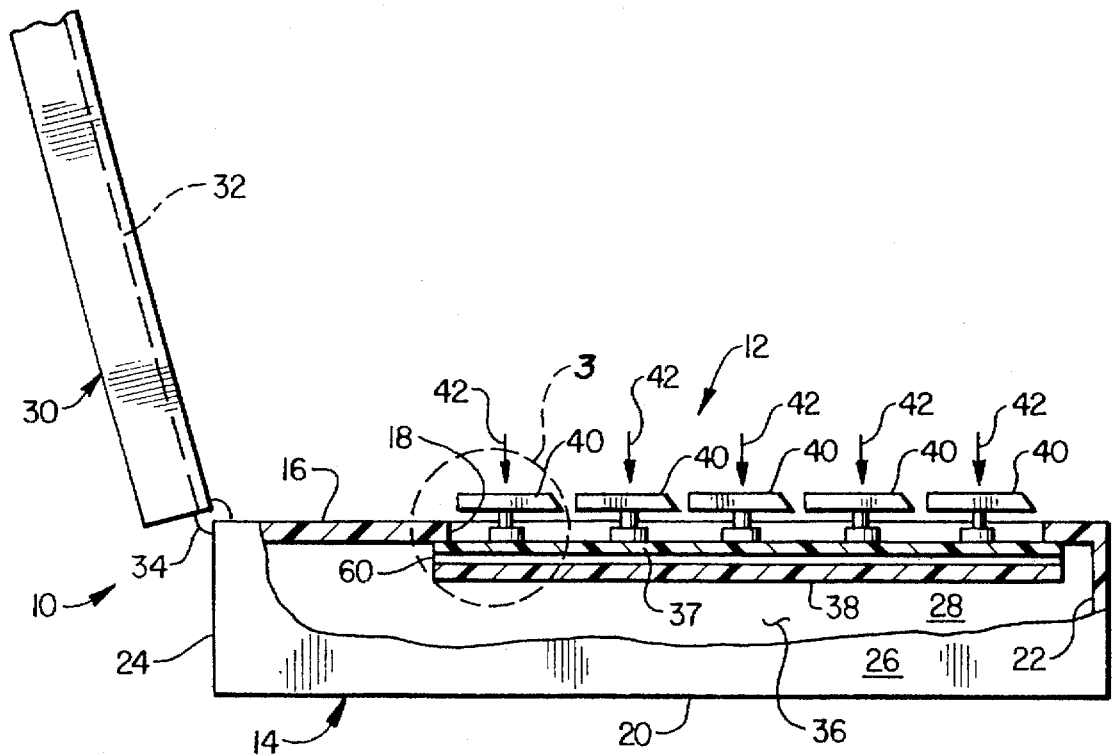
FIG. 1 is a partially sectioned, simplified side elevational view of a representative notebook computer having a collapsible keyboard structure embodying principles of the present invention, the computer being in an opened orientation and the keyboard structure being in its key-extended use configuration.
Figure 2:
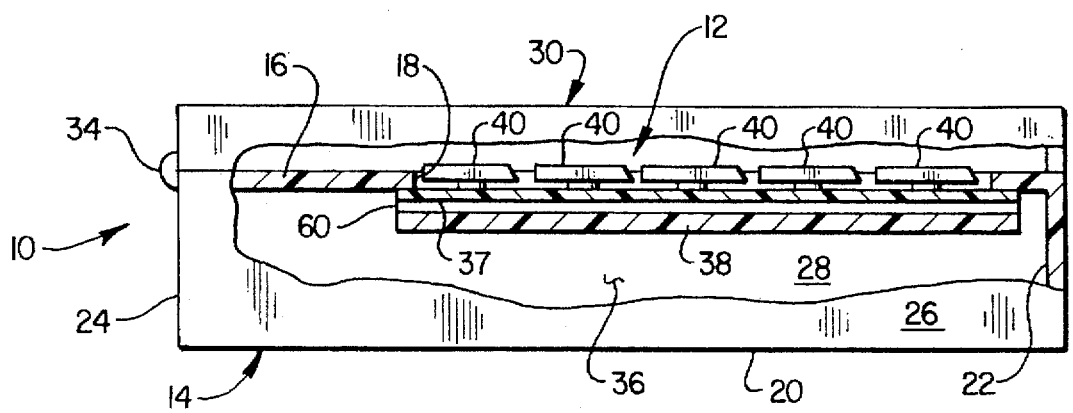
FIG. 2 is a view similar to that in FIG. 1, but with the computer in its closed orientation and the keyboard structure being in its key-retracted storage/transport orientation.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1–3B, the keyboard structure basically comprises a support structure which is representatively in the form of vertically spaced upper and lower support plates 37 and 38 that horizontally extend through a top side portion of the base housing 14 beneath its top wall opening 18, and a series of key switch assemblies each including a manually depressible key cap member 40 carried for vertical movement relative to the upper support plate 37 (as indicated by the arrows 42 in FIGS. 1 and 3A) through a total keystroke travel distance D (see FIG. 3A).

As can be best seen in FIGS. 3A and 3B, each key cap member 40 has a force transfer portion associated therewith, such force transfer portion representatively being in the form of a cylindrical plastic plunger member 44 axially projecting from the bottom side of the key cap member and slidably received in the interior of a vertically oriented tubular plastic barrel member 46 having an annular bottom end 48 suitably secured to the top side 49 of the upper support plate 37, and an annular top end 50.

A circularly cross-sectioned opening 51 is formed through the top support plate 37 and also slidably receives a longitudinal portion of the plunger 44. A bottom portion of the opening 51 is diametrically enlarged, as at 52, to form a downwardly facing annular ledge 54 slightly inset from the bottom side of the top support plate 37. At the bottom end of the plunger 44 is a relatively thin diametrically enlarged disc-shaped portion 56 which is upwardly receivable in the opening enlargement 52. As can be seen by comparing FIGS. 3A and 3B, the annular ledge 54 functions as a stop surface to prevent the plunger's upward removal from its associated barrel member 46. A spline (not visible in FIGS. 3A and 3B) is formed on the plunger member 44 and is slidably received within a corresponding vertical keyway (also not visible in FIGS. 3A and 3B) formed within the barrel member 46 to prevent rotation of the key cap member 40 relative to the barrel member 46.

Each key cap member 40 is vertically movable relative to the upper support plate 37 upon which it is mounted, through the total key stroke travel distance D, between (1) an upwardly extended use orientation shown in FIG. 3A (in which the enlarged lower plunger end portion 56 upwardly engages the annular interior ledge 54), and (2) a downwardly retracted storage and transport orientation on shown in FIG. 3B (in which the bottom side of the key cap member 40 downwardly engages the top end 50 of the barrel member 46). As the key cap member 40 downwardly approaches its FIG. 3B retracted storage/transport orientation, the key cap/plunger assembly 40,44 reaches a vertically intermediate key switch activation or "firing" position indicated by the dashed line position of the plunger structure 44,56 shown in FIG. 3A.

For purposes later described herein, at each key switch assembly a position sensor 58 is used to monitor the vertical position of the associated key cap member 40 and responsively output a position signal indicative of the sensed key cap stroke position. Each position sensor 58 is representatively a photocell-type position sensor mounted on the upper side 49 of the top support plate 37 in a facing relationship with an underside portion of the associated key cap member 40.

Each key switch assembly also includes a horizontally oriented hollow flexible pad member 60 which is sandwiched between the upper and lower support plates 37 and 38 as illustrated in FIGS. 1–3B. Pad member 60 is adapted to receive a pressurized fluid (i.e., either a gas or liquid), and functions as later described herein to use an internal pressurized fluild force to yieldingly bias each key cap member 40, via its associated plunger 44) upwardly toward its FIG. 3A extended use position.

Figure 4:
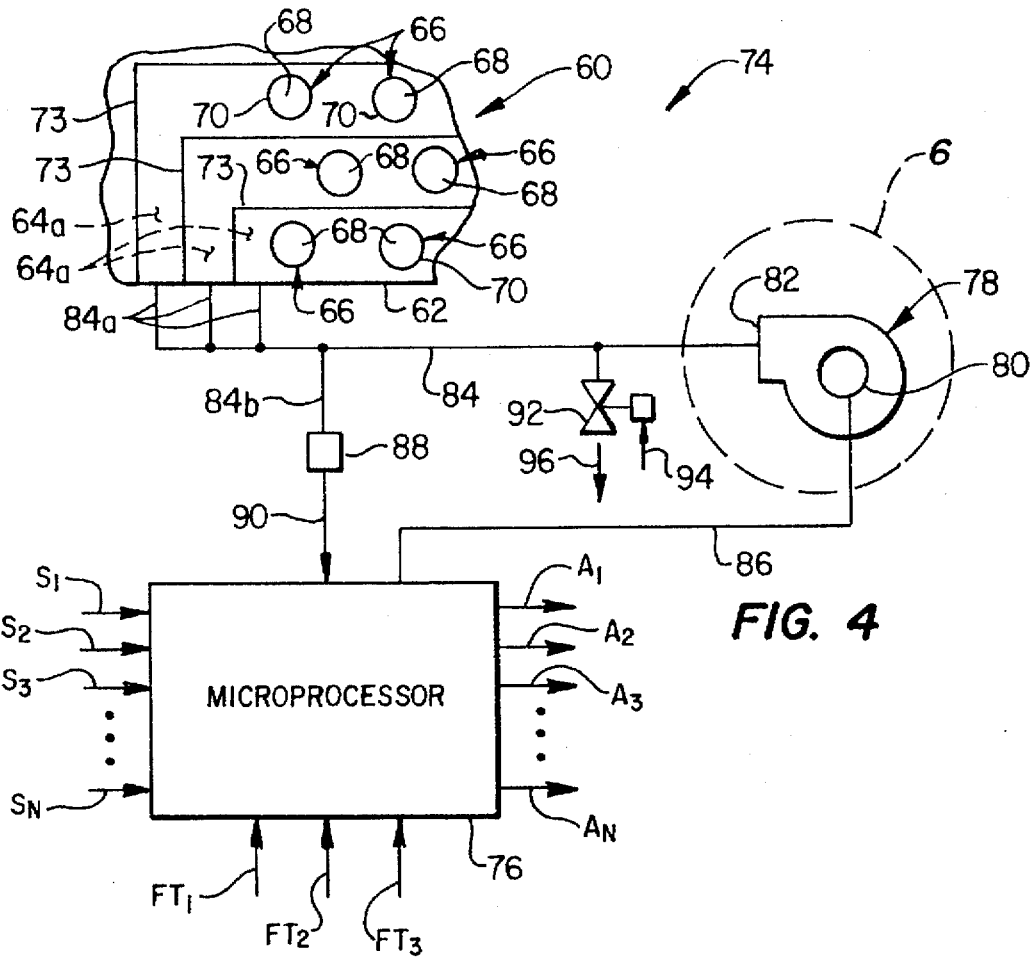
FIG. 4 is a schematic diagram of a control system, and a top plan view of an associated hollow fluid pressurizable pad structure, operative to selectively vary the keystroke force/distance characteristics of the keyboard using pressurized fluid forces imposed on the pad structure by the individual keys.

With reference now to FIGS. 3A–4, the pad member 60 comprises a main flexible body portion 62 whose interior 64 is representatively filled with pressurized air. A spaced series of separate subcompartments 66 are formed in the body 62 and are positioned in underlying alignment with the bottom ends 56 of the key cap plungers 44. Representatively, each subcompartment 66 has a generally circular shape, a raised top side wall 68 which upwardly engages an associated overlying bottom plunger end 56, and a tubular side wall section 70 that seals the interior 66a of the subcompartment off from the main interior space 64 of the pad member body 62.

To regulate the flow of pressurized air between the body and subcompartment interiors 64,66a for purposes later described, an orifice opening 72 is formed in each of the subcompartment side wall sections 70. As illustrated in FIG. 4, the interior 64 of the pad body 62 is preferably subdivided into separated zones 64a by means of body partition walls 73. Each zone 64a contains a group of the spaced subcompartments 66 therein.

As best illustrated in FIGS. 3A and 3B, the interiorly pressurized pad subcompartments 66, via the plungers 44 that they upwardly engage, serve to yieldingly bias the key caps 40 upwardly toward their FIG. 3A extended use positions. When any of the key cap members 40 is manually depressed downwardly from its FIG. 3A extended use position toward its FIG. 3B retracted position, the associated subcompartment top side wall 68 is forcibly deformed into the interior 66a of the subcompartment 66, thereby forcing air from the subcompartment interior 66a outwardly through the orifice 72 into the surrounding main interior portion 64 of the pad body 62.

When the key cap is released, pressurized air in the main pad interior space 64 flows back into the interior 66a of the subcompartment 66, via the sidewall section orifice 72, to cause the subcompartment top side wall 68 to again resiliently return the key cap 40 to its FIG. 3A upwardly extended use position. By relieving the pressure in the main pad body interior space 64 as later described herein, the key caps 40 may be collapsed to their FIG. 3B retracted storage and transport positions by, for example, closing the computer lid housing 30 against the top side of the key cap members 40 as shown in FIG. 2.

The position sensors 58 and the interiorly pressurized hollow pad member 60 form a portion of a key control system 74 (see FIG. 4) which, in addition to permitting the key cap members 40 to be collapsed to retracted storage/transport positions, is utilized to regulate the keystroke force/travel characteristics of the keyboard 12 in a selectively variable manner. Key control system 74 also includes a controller representatively in the form of a microprocessor 76, and a fluid pump representatively in the form of an air pump 78 having a variable speed electric drive motor 80.

The outlet 82 of the pump 78 is coupled to a fluid supply conduit 84 communicated with the pad zone interior spaces 64a via branch conduit lines 84a. Operation of the pump 78 serves to variably pressurize the pad interior spaces 64a and, via the orifices 72, the interiors 66a of the spaced pad subcompartments 66 as well. The variable speed pump motor 80 is coupled to the microprocessor 76 by an electrical signal lead 86. A fluid conduit branch line 84b is connected to the inlet of a pressure-to-electric transducer 88 having an electrical output lead 90 connected to the microprocessor 76.

A pressure relief valve 92 is connected to the supply conduit 84. Upon receipt of an appropriate control signal 94 (generated, for example, when the computer is turned off), the valve 92 is operative to bleed air 96 from the conduit 84, and thus the pad interior zones 64a, to thereby permit the key cap members 40 to be collapsed to their retracted storage and transport positions as previously described above.

As the key cap members 40 are manually depressed by the computer user, the position sensors 58 output to the microprocessor 76 vertical key position signals $S_1$–$S_N$ corresponding to their associated key cap members. When the key cap members 40 are depressed to the dashed line activation position shown in FIG. 3A the microprocessor 76 automatically reacts to the related magnitudes of the key position signals $S_1$–$S_N$ by responsively outputting the indicated key activation signals $A_1$–$A_N$ which may be utilized in a generally conventional manner to cause the computer to carry out the command associated with the activation of the given key.

According to a feature of the present invention, the microprocessor 76 is preferably programmed to receive one of a plurality (representatively three) of mutually different user-selected desired keystroke force/travel characteristic signals $FT_1$, $FT_2$ and $FT_3$. For example, the user-selected input signal $FT_1$, could be the key force/travel relationship graphically depicted by the solid and dashed lines in the graph in FIG. 5 wherein the solid line represents the selected key force/travel relationship during the downward activation stroke of a key, and the dashed line represents the hysteresis-reduced upward return force/travel characteristics of the key.

Figure 5:
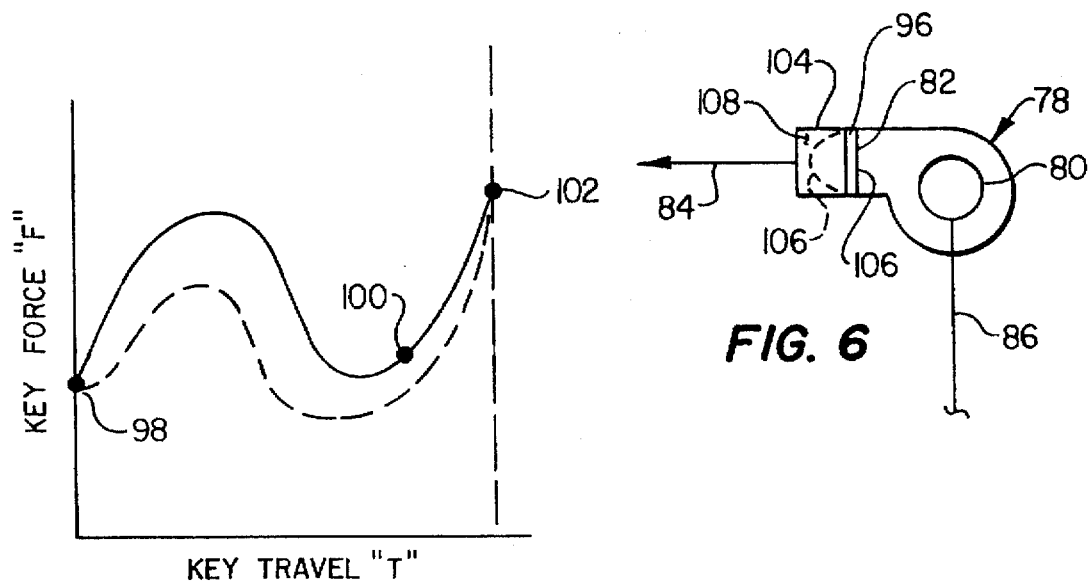
FIG. 5 is a graph illustrating a representative keystroke force/distance relationship provided to the keyboard by the FIG. 4 control system.

As can be seen in the solid line curve in FIG. 5, during an initial downward movement of a given key cap member 40 from its FIG. 3A upwardly extended use position point 98 the necessary key depression force increases and then decreases before beginning to increase again as the key cap member approaches its activation point 100, with the key depression force continuing to increase until the key cap member downwardly reaches its FIG. 3B retracted storage and transport orientation point 102.

As previously described herein, when any of the key cap members 40 is manually depressed during operation of the computer 10, the associated key cap plunger 44 forces air out of its underlying pad subcompartment 66 into its associated pad interior zone 64a (see FIG. 4), thereby increasing the air pressure therein and correspondingly increasing the pressure within the fluid supply conduit 84. Correspondingly, when the key cap member is released, thereby permitting pressurized air to re-enter its compartment 66, the pressure in the associated pad interior zone 64a decreases. These pressure increases and decreases are reflected by similar signal magnitude increases and decreases in the electrical output lead 90 from transducer 88.

In response to receipt of a selected one of the keystroke force/travel input signals $FT_1$–$FT_3$ the microprocessor 76 automatically varies the magnitude of the voltage transmitted to the variable speed pump motor 80 via lead 86 to cause the pump 78 to vary the fluid pressure within the pad 60 (as sensed by the transducer 88 and reflected in the magnitude of microprocessor-received output signal 90) as a function of the sensed magnitudes of the received key position signals $S_1$–$S_N$, to maintain the keystroke force/travel relationship (for example, the previously described solid and dashed line curves in the FIG. 5 graph) associated with the particular user-selected input signal $FT_1$, $FT_2$ or $FT_3$ as the case may be.

While the control system 74 has been described as utilizing a pressurizable gas (e.g., air) in the pad 60, a liquid such as water could be used instead. This could provide the additional advantage of being able to place the liquid-filled pad 60 against a heat-generating computer component such as a processor and use the pad as a heat receiving and spreading device in addition to its key-controlling function.

Figure 6:
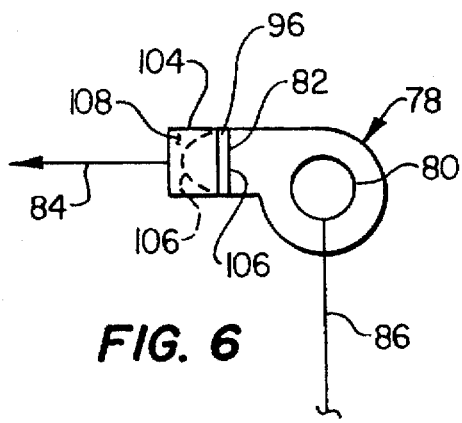
FIG. 6 is a diagram of an alternate embodiment of the portion of the FIG. 4 control system shown in the circled area "6" of FIG. 4.

To utilize a liquid in the pad instead of a gas, a simple modification can be made to the control system 74 as schematically depicted in FIG. 6. Specifically, when liquid is to be utilized a reservoir structure 104 s secured to the air pump outlet 82, the reservoir structure having a flexible diaphragm member 106 extending across its interior with air 96 being disposed on the right side of the diaphragm 106, and the system liquid 108 (for example, water) being disposed on the left side of the diaphragm 106.

During operation of the pump 78, its discharge air pressure leftwardly flexes the diaphragm 106 to its dotted line position in FIG. 6 to thereby variably pressurize the liquid in the pad 60 as a function of the varied speed of the air pump motor 80. When the pump 78 is turned off (for example, when the computer is turned off), the air pressure on the right side of the diaphragm 106 is relieved, thereby permitting the diaphragm 106 to rightwardly return to its solid line relaxed position. This, in turn, reduces the liquid pressure in the pad 60 and permits the key cap members 40 to be collapsed to their retracted storage and transport orientations as previously described in conjunction with the air filled pad 60.

In a relatively simple manner the present invention thus provides a computer keyboard in which the individual key switch assemblies (1) are collapsible to reduce the thickness of the keyboard with the computer in a storage/transport orientation, and (2) have selectively adjustable keystroke force/travel characteristics to accommodate a variety of user keyboard "feel" preferences.

As will be readily appreciated by those of skill in this particular art, the principles of this invention are not limited to either the computer or keyboard arenas. For example, the key switch assemblies and related control system representatively illustrated and described herein can also be advantageously utilized in keyboards of other electronic devices, or in a variety of manually depressible switch devices wholly unrelated to keyboards, if desired.

The foregoing detailed description is to be clearly understood as being given by way of illustration and example only, the spirit and scope of the present invention being limited solely by the appended claims.

What is claimed is:

1. Switch apparatus comprising:

a support structure;

a manually operable switch member carried on said support structure for a stroke movement relative thereto between first and second positions;

a biasing structure operative to yieldingly bias said switch member toward said first position utilizing a selectively variable fluid pressure biasing force; and control apparatus operative to sense the stroke position of said switch member and responsively vary said fluid pressure biasing force as a function of the sensed stroke position in accordance with a predetermined desired relationship between the switch member stroke position and the magnitude of said fluid pressure biasing force.

2. The switch apparatus of claim 1 wherein:

said predetermined desired relationship is a nonlinear relationship.

3. The switch apparatus of claim 1 wherein:

said control apparatus is further operative to selectively vary said predetermined desired relationship.

4. The switch apparatus of claim 1 wherein:

in the absence of said fluid pressure biasing force said switch member is collapsible from said first position to said second position.

5. The switch apparatus of claim 1 wherein:

said switch member has an activation position intermediate said first and second positions, and said control apparatus is further operative to generate a switch activation signal in response to said switch member reaching said activation position while approaching said second position.

6. Keyboard apparatus comprising:

a support structure;

a series of manually depressible key cap members each carried on said support structure for a stroke movement relative thereto between an outwardly extended use position and an inwardly retracted storage and transport position;

a biasing structure associated with said key cap members and operative to utilize a pressurized fluid force in a manner yieldingly biasing said key cap members toward their outwardly extended use positions; and control apparatus operative to sense the stroke position of each key cap member and responsively vary the pressurized fluid biasing force thereon as a function of the sensed stroke position in accordance with a predetermined desired key force/key travel relationship for said keyboard apparatus.

7. The keyboard apparatus of claim 6 wherein:

said predetermined desired key force/key travel relationship is a nonlinear relationship.

8. The keyboard apparatus of claim 6 wherein:

said control apparatus is further operative to selectively vary said predetermined desired key force/key travel relationship.

9. The keyboard apparatus of claim 6 wherein:

in the absence of said biasing force thereon said key cap members are collapsible to said inwardly retracted storage and transport positions thereof.

10. The keyboard apparatus of claim 6 wherein:

each key cap member has a key activation position intermediate its extended and retracted positions, and said control apparatus is further operative to generate a key activation signal for each key cap member in response to the key cap member reaching its key activation position while approaching its retraced position.

11. The keyboard apparatus of claim 6 wherein:

said keyboard is an electronic device keyboard.

12. The keyboard apparatus of claim 11 wherein:

said keyboard is a computer keyboard.

13. The keyboard apparatus of claim 12 wherein:

said keyboard is a portable computer keyboard.

14. The keyboard apparatus of claim 13 wherein:

said keyboard is a notebook computer keyboard.

15. The keyboard apparatus of claim 6 wherein:

said biasing structure includes a hollow flexible biasing member underlying said key cap members and adapted to contain a quantity of pressurized fluid, and force transfer members carried by said key cap members for movement therewith, said force transfer members exteriorly engaging said biasing member in a manner utilizing pressurized fluid therein to yieldingly bias each key cap member toward its extended position and alter the fluid pressure within said biasing member as a function of the stroke position of the key cap member, and said control apparatus is operative to vary the fluid pressure within said biasing member in response to sensed variations thereof caused by a stroke movement of one of said key cap members.

16. The keyboard apparatus of claim 15 wherein:

said biasing member is adapted to hold a quantity of gas.

17. The keyboard apparatus of claim 15 wherein:

said biasing member is adapted to hold a quantity of liquid.

18. The keyboard apparatus of claim 15 wherein:

said control apparatus further includes a pressure relief structure operative to selectively relieve the pressure within said biasing member in a manner permitting said key cap members to be collapsed from said outwardly extended use positions thereof to said inwardly retracted storage and transport positions thereof.

19. The keyboard apparatus of claim 15 wherein:

said biasing member has a main hollow body portion with a spaced series of walled off subcompartment portions aligned with and engaged by said force transfer members, said subcompartment portions having wall sections with with orifices therein through which the interiors of said subcompartment portions communicate with surrounding interior portions of said main hollow body portion.

20. The keyboard apparatus of claim 19 wherein:

said control apparatus includes a variable speed fluid pump having an outlet communicated with the interior of said main hollow body portion, and said control apparatus is operative to vary the speed of said fluid pump in response to sensed variations in the fluid pressure within said biasing member.

21. The keyboard apparatus of claim 20 wherein:

said control apparatus includes a series of position sensors operative to sense the stroke positions of said key cap members and responsively output position sensing signals indicative of the sensed key cap member stroke positions.

22. The keyboard apparatus of claim 21 wherein:

said control apparatus further includes a microprocessor operatively connected to said position sensors, said fluid pump and said biasing member.

23. A computer having a keyboard portion comprising:

a support structure;

a series of manually depressible key cap members each carried on said support structure for a stroke movement relative thereto between an outwardly extended use position and an inwardly retracted storage and transport position;

a biasing structure associated with said key cap members and operative to utilize a pressurized fluid force in a manner yieldingly biasing said key cap members toward their outwardly extended use positions; and control apparatus operative to sense the stroke position of each key cap member and responsively vary the pressurized fluid biasing force thereon as a function of the sensed stroke position in accordance with a predetermined desired key force/key travel relationship for said keyboard apparatus.

24. The computer of claim 23 wherein:

said predetermined desired key force/key travel relationship is a nonlinear relationship.

25. The computer of claim 23 wherein:

said control apparatus is further operative to selectively vary said predetermined desired key force/key travel relationship.

26. The computer of claim 23 wherein:

in the absence of said biasing force thereon said key cap members are collapsible to said inwardly retracted storage and transport positions thereof.

27. The computer of claim 23 wherein:

each key cap member has a key activation position intermediate its extended and retracted positions, and said control apparatus is further operative to generate a key activation signal for each key cap member in response to the key cap member reaching its key activation position while approaching its retraced position.

28. The computer of claim 23 wherein:

said computer is a portable computer.

29. The computer of claim 28 wherein:

said computer is a notebook computer.

30. The computer of claim 23 wherein:

said biasing structure includes a hollow flexible biasing member underlying said key cap members and adapted to contain a quantity of pressurized fluid, and force transfer members carried by said key cap members for movement therewith, said force transfer members exteriorly engaging said biasing member in a manner utilizing pressurized fluid therein to yieldingly bias each key cap member toward its extended position and alter the fluid pressure within said biasing member as a function of the stroke position of the key cap member, and said control apparatus is operative to vary the fluid pressure within said biasing member in response to sensed variations thereof caused by a stroke movement of one of said key cap members.

31. The computer of claim 30 wherein:

said biasing member is adapted to hold a quantity of gas.

32. The computer of claim 30 wherein:

said biasing member is adapted to hold a quantity of liquid.

33. The computer of claim 30 wherein:

said control apparatus further includes a pressure relief structure operative to selectively relieve the pressure within said biasing member in a manner permitting said key cap members to be collapsed from said outwardly extended use positions thereof to said inwardly retracted storage and transport positions thereof.

34. The computer of claim 30 wherein:

said biasing member has a main hollow body portion with a spaced series of walled off subcompartment portions aligned with and engaged by said force transfer members, said subcompartment portions having wall sections with orifices therein through which the interiors of said subcompartment portions communicate with surrounding interior portions of said main hollow body portion.

35. The computer of claim 34 wherein:

said control apparatus includes a variable speed fluid pump having an outlet communicated with the interior of said main hollow body portion, and said control apparatus is operative to vary the speed of said fluid pump in response to sensed variations in the fluid pressure within said biasing member.

36. The computer of claim 35 wherein:

said control apparatus includes a series of position sensors operative to sense the stroke positions of said key cap members and responsively output position sensing signals indicative of the sensed key cap member stroke positions.

37. The computer of claim 36 wherein:

said control apparatus further includes a microprocessor operatively connected to said position sensors, said fluid pump and said biasing member.

\* \* \* \* \*